Aug. 10, 1937.                W. C. NABORS                2,089,290
                        TRAILER STEERING CONSTRUCTION
                      Filed Sept. 11, 1936        2 Sheets-Sheet 1

Inventor
William C. Nabors

By
Edward V. Hardway
Attorney

Aug. 10, 1937.　　　W. C. NABORS　　　2,089,290
TRAILER STEERING CONSTRUCTION
Filed Sept. 11, 1936　　　2 Sheets-Sheet 2

Inventor
William C. Nabors
By Edward V. Hartway,
Attorney

Patented Aug. 10, 1937

2,089,290

UNITED STATES PATENT OFFICE 2,089,290

TRAILER STEERING CONSTRUCTION

William C. Nabors, Mansfield, La.

Application September 11, 1936, Serial No. 100,265

4 Claims. (Cl. 280—33.5)

This invention relates to trailer steering construction.

It is an object of the invention to provide in a steering mechanism specially designed for use in four wheel trailers whereby the rear wheel assembly may be connected to the front axle by means of specially designed fifth wheel construction allowing free and easy turning.

It is another object of the invention to provide a fifth wheel construction for the purpose specified whereby the range of turning movement of the front wheels of the trailer will be limited.

It is a further object of the invention to provide a novel type of front axle assembly for a four wheel trailer, said assembly including a novel type of fifth wheel construction as well as a novel type of draw bar connection.

With the above and other objects in view the invention has particular relation to certain novel features of construction, operation and arrangement of parts, an example of which is given in this specification and illustrated in the accompanying drawings, wherein:—

Referring now more particularly to the drawings wherein like numerals of reference designate the same parts in each of the figures, the numeral 1 designates the front axle which, in cross section, is preferably square, although it may be made of any selected shape. The axle is supported by the front wheels, 2, 2.

Figure 1:
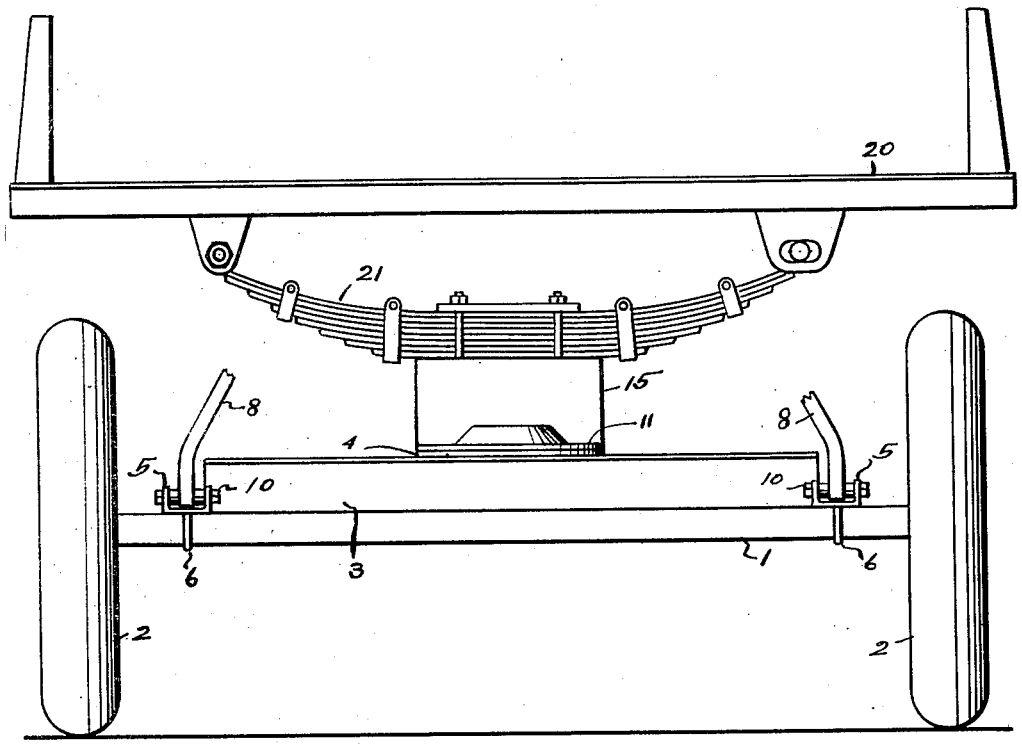
Figure 1 shows a front elevation of the front assembly.
Figure 2:
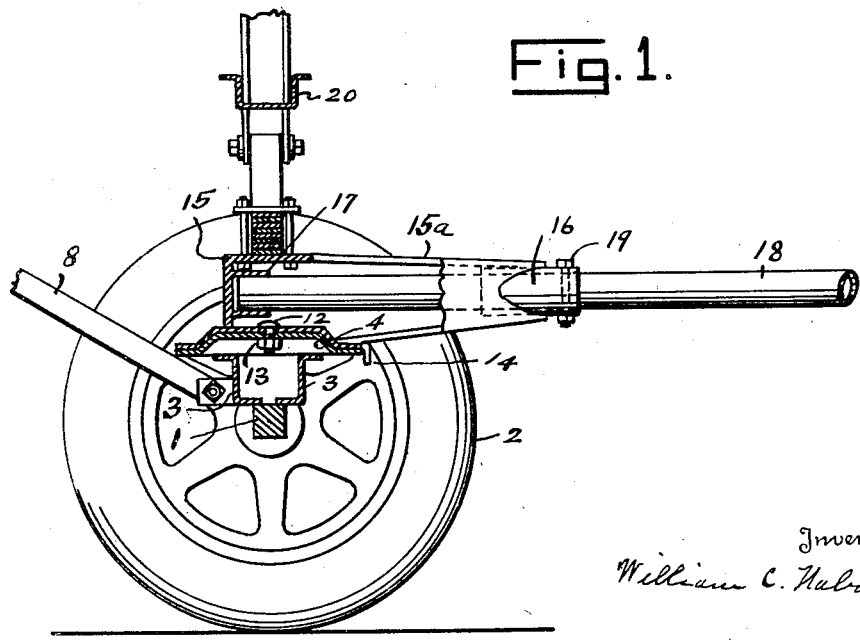
Figure 2 shows a longitudinal vertical sectional view thereof.

Welded or otherwise secured on the axle are the oppositely disposed transverse Z-bars 3, 3 whose lower flanges are inwardly turned and rest on the axle and whose upper flanges are outwardly turned, as more accurately shown in Figure 2. These Z-bars add strength to the front axle and prevent concentration of the load at the center of the axle, their upper flanges being outwardly turned also form a wide support for the lower fifth wheel 4 which is mounted thereon and secured thereto, preferably by welding. This lower fifth wheel is circular in shape and is of an inverted saucer shaped contour.

Supported on the axle at the respective ends of the Z-bars 3 are the channels 5, 5 which extend transversely of said axle and are preferably welded to the adjacent ends of the Z-bars as well as to the axle and are further secured firmly in place by the U-bolts 6, 6 which surround the axle and extend through the channels and whose upper ends are threaded to receive the nuts 7, 7.

Figure 3:
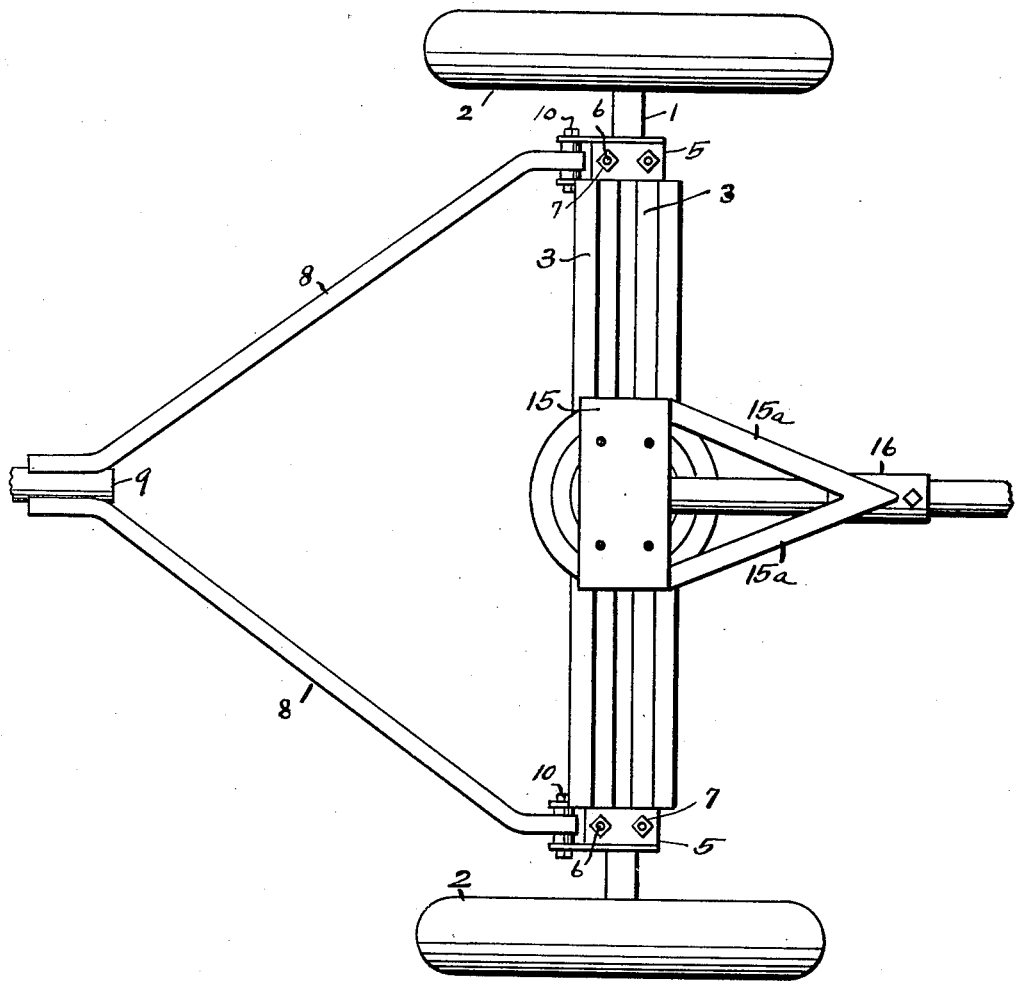
Figure 3 shows a plan view thereof.
Figure 4:
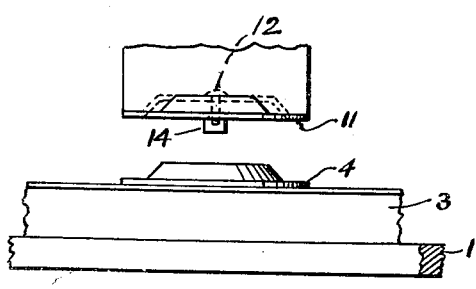
Figure 4 shows a fragmentary front elevation.

The side flanges of the channels 5 are forwardly extended and the rearwardly diverging side bars 8, 8 of the trailer hitch 9 are located between said forwardly extended flanges and are pivotally secured therein by means of cross pins 10, 10. A very sturdy construction of the front axle assembly is thus provided. An inverted saucer shaped upper fifth wheel 11 is fitted over the lower fifth wheel 4 and a central king pin 12 is welded to the upper fifth wheel and extended through a central bearing in the lower fifth wheel and its lower end is threaded to receive the nut 13 whereby the fifth wheels are secured together in such manner as to permit their relative turning. The rear margin of the upper fifth wheel has a downwardly turned lug 14 which depends beneath the lower fifth wheel and which forms a stop engageable against the upper flange of the rear Z bar 3 to limit the turning movements of the front wheels of the trailer. The upper fifth wheel is secured, preferably by welding, to a box-like housing 15, said upper fifth wheel forming the bottom of said housing. The sides 15a, 15a of the housing converge rearwardly and a draw bar sleeve 16 is located between and welded to the rear ends of said sides, as shown in Figures 2 and 3. The inner side of the forward end of the housing 15 is provided with a bearing sleeve 17. The front end of the draw bar 18 is fitted through the sleeve 16 and into the bearing 17 and is secured therein by the cross pin 19 and extends through the sleeve 16 as well as through the draw bar.

The front bolster 20 may be mounted above the front axle in any suitable manner; in the form shown it is supported on a leaf spring 21 secured on the housing 15.

The drawings and description disclose what is now considered to be a preferred form of the invention by way of illustration only but the broad principle of the invention will be defined by the appended claims.

What I claim is:—

1. A trailer steering construction comprising an axle, bars extending longitudinally of the axle mounted thereon and secured thereto, the upper margins of said bars being overturned forming supporting flanges, a concavo-convex lower fifth wheel secured on said flanges, an upper fifth wheel conforming in shape to and fitting closely over the lower fifth wheel, a draft bar connection supported on the upper fifth wheel and forming supporting means for a front bolster and having front and rear bearings to receive the forward end of the draft bar.

2. A trailer steering construction, a front axle, an approximately concavo-convex lower fifth wheel thereon with its convex side upwardly, a housing having an upper fifth wheel thereon shaped to conform to the shape of and to fit over the lower fifth wheel, a king pin securing the fifth wheels in assembled relation, said housing forming also a draft bar connection, and forming supporting means for the front bolster, a front draft bar bearing housed within the housing and a rear draft bar bearing connected to the housing and aligned with the front bearing.

3. A trailer steering construction comprising a front axle, an approximately concavo-convex lower fifth wheel on the axle with its convex side upwardly, a housing box-like in form, an upper fifth wheel on the housing shaped to conform to the shape of and to fit over the lower fifth wheel, a king pin securing the fifth wheels in assembled relation, said housing having a front wall and having rearwardly converging sides, a sleeve on the rear end of the housing forming a rear draw bar bearing, an inside sleeve on the front wall of the housing forming a front draw bar bearing, and a bolster above and supported on said housing.

4. A trailer steering construction comprising a front axle, an approximately concavo-convex lower fifth wheel on the axle with its convex side upwardly, a housing, box-like in form, an upper fifth wheel on the housing shaped to conform to the shape of and to fit over the lower fifth wheel, a king pin securing the fifth wheels in assembled relation, said housing having a front wall and having rearwardly converging sides, a sleeve on the rear end of the housing forming a rear draw bar bearing, an inside sleeve on the front wall of the housing forming a front draw bar bearing, a bolster above and supported on said housing, and a depending stop on the margin of the upper fifth wheel which works closely about the rear margin of the lower fifth wheel and is engageable with the axle to limit the turning movement of the axle.

WILLIAM C. NABORS.